United States Patent
McAllister et al.

(10) Patent No.: US 11,941,902 B2
(45) Date of Patent: Mar. 26, 2024

(54) SYSTEM AND METHOD FOR ASSET SERIALIZATION THROUGH IMAGE DETECTION AND RECOGNITION OF UNCONVENTIONAL IDENTIFIERS

(71) Applicant: KPMG LLP, New York, NY (US)

(72) Inventors: Charles Scott McAllister, Silver Spring, MD (US); Arun Aggarwal, Dallas, TX (US); John Henry Rudisill, Atlanta, GA (US); Viral Chawda, Frisco, TX (US); Kimball Hill, Salt Lake City, UT (US)

(73) Assignee: KPMG LLP, New York, NY (US)

( * ) Notice: Subject to any disclaimer, the term of this patent is extended or adjusted under 35 U.S.C. 154(b) by 61 days.

(21) Appl. No.: 17/659,286

(22) Filed: Apr. 14, 2022

(65) Prior Publication Data

US 2023/0186662 A1 Jun. 15, 2023

Related U.S. Application Data

(60) Provisional application No. 63/265,167, filed on Dec. 9, 2021.

(51) Int. Cl.
*G06V 30/14* (2022.01)
*G06V 30/12* (2022.01)
*G06V 30/19* (2022.01)
*G06V 30/224* (2022.01)

(52) U.S. Cl.
CPC ........ *G06V 30/1456* (2022.01); *G06V 30/133* (2022.01); *G06V 30/19147* (2022.01); *G06V 30/1916* (2022.01); *G06V 30/2247* (2022.01)

(58) Field of Classification Search
CPC .......... G06V 30/1456; G06V 30/2247; G06V 30/19147; G06V 30/1916; G06V 30/133
See application file for complete search history.

(56) References Cited

U.S. PATENT DOCUMENTS

| | | | |
|---|---|---|---|
| 7,106,905 B2* | 9/2006 | Simske | G06F 40/242 707/999.005 |
| 10,992,606 B1* | 4/2021 | Mitchell | G06Q 20/027 |
| 11,049,063 B2* | 6/2021 | Ali | G06Q 10/087 |
| 11,269,883 B2* | 3/2022 | Reed | G06Q 10/20 |
| 11,295,783 B2* | 4/2022 | Shen | H04N 21/45457 |
| 11,580,348 B2* | 2/2023 | Volkerink | B32B 37/06 |
| 2009/0146832 A1 | 6/2009 | Ebert et al. | |
| 2016/0069644 A1 | 3/2016 | Bell | |
| 2018/0137349 A1 | 5/2018 | Such et al. | |

(Continued)

OTHER PUBLICATIONS

International Searching Authority, PCT Notification of the International Search Report and Written Opinion, International Application No. PCT/US22/51902, dated Mar. 7, 2023, pp. 1-15.

(Continued)

*Primary Examiner* — Gregory M Desire
(74) *Attorney, Agent, or Firm* — Hunton Andrews Kurth LLP (57) ABSTRACT

An embodiment of the present invention is directed to a combination of two deep-learning computer vision models—customized with post-processing—wrapped in a mobile application that is backed by an Application Programming Interface (API) supporting concurrent mobile users to accomplish asset serialization tasks in a warehouse or other storage environment.

20 Claims, 9 Drawing Sheets

(56) References Cited

U.S. PATENT DOCUMENTS

2020/0311658 A1* 10/2020 Gundel ............... G06Q 10/087
2020/0356254 A1   11/2020 Missig et al.
2021/0056499 A1    2/2021 Jacobus et al.
2021/0182773 A1*  6/2021 Padmanabhan ......... H04W 4/35
2021/0248693 A1    8/2021 Riland et al.
2022/0230020 A1*  7/2022 Saeugling ............. G06V 10/25

OTHER PUBLICATIONS

Y. Baek et al.; Character Region Awareness for Text Detection, CVPR paper, 2019, pp. 9365-9374.

J. Baek et al; What Is Wrong With Scene Text Recognition Model Comparisons?Dataset and Model Analysis, Clova AI Research, arXiv:1904.01906v4 [cs.CV] Dec. 18, 2019, pp. 1-19.

* cited by examiner

SYSTEM AND METHOD FOR ASSET SERIALIZATION THROUGH IMAGE DETECTION AND RECOGNITION OF UNCONVENTIONAL IDENTIFIERS

CROSS REFERENCE TO RELATED APPLICATIONS

The application claims priority to U.S. Provisional Application 63/265,167, filed Dec. 9, 2021, the contents of which are incorporated by reference herein in their entirety.

FIELD OF THE INVENTION

The present invention relates to systems and methods for asset serialization and more specifically to image detection and recognition for identifiers associated with unique and unconventional assets.

BACKGROUND

Certain industries require unique and customized assets for various government and public health uses. Many of these assets are not tracked using common bar codes or serial numbers. Instead, such assets are identified through engraving, etching and other techniques for permanently carving on a hard surface.

In the defense and public health sectors, there are various types of assets that do not have an associated identifier. For example, defense or military assets may include weaponry, machinery and other components. Identifiers may be etched, embossed, printed or otherwise carved/fixed on the asset. In healthcare, medical devices in varying sizes and uses may be impacted. In addition, such assets may be considered highly sensitive, classified and/or otherwise restricted to the general public. Generally, there is a resistance to creating a new inventory of identifiers and then tagging such assets with the new identifiers. Currently, no viable solution is available to support these types of assets other than completely manual methods that involve a team of workers to manually read, log and confirm serial numbers. Moreover, given poor lighting and other difficult warehouse storage conditions, serial numbers may not be readily ascertainable on these unique assets.

It would be desirable, therefore, to have a system and method that could overcome the foregoing disadvantages of known systems.

SUMMARY

According to one embodiment, the invention relates to a computer-implemented system for image detection and recognition of unscannable identifiers. The system comprises: an interactive user interface that is configured to receive one or more inputs; a database interface that communicates with a database that stores and manages asset data; and a processor executing on a mobile device and coupled to the interface and the database interface, the processor further configured to perform the steps of: receiving, via an input interface, a scan of an image associated with an asset; detecting, via a computer vision detection model, a text from the scan wherein the text is imprinted on the asset and the asset is a customized asset without a conventional serial number; performing, via a prediction model, text recognition of the text and identifying one or more predicted texts with corresponding confidence levels; performing post processing on the one or more predicted texts to improve prediction accuracy; displaying, via the interactive user interface executing on the mobile device, the one or more predicted texts; receiving one or more user inputs responsive to the one or more predicted texts; and improving the prediction model based on the one or more user inputs.

According to one embodiment, the invention relates to a computer-implemented method for image detection and recognition of unscannable identifiers. The method comprises the steps of: receiving, via an input interface, a scan of an image associated with an asset; detecting, via a computer vision detection model, a text from the scan wherein the text is imprinted on the asset and the asset is a customized asset without a conventional serial number; performing, via a prediction model, text recognition of the text and identifying one or more predicted texts with corresponding confidence levels; performing post processing on the one or more predicted texts to improve prediction accuracy; displaying, via an interactive user interface executing on the mobile device, the one or more predicted texts; receiving one or more user inputs responsive to the one or more predicted texts; and improving the prediction model based on the one or more user inputs.

An embodiment of the present invention is directed to an asset identification system for unique assets in the defense, healthcare and other industries and environments that lack traditional serial numbers or identifiers. An embodiment of the present invention addresses challenges involving unique assets stored and managed in a warehouse or other setting. An embodiment of the present invention recognizes that certain unique assets do not have an associated tag, label or RFID that can be easily scanned. Current technology is unable to accurately and efficiently capture an identifier when it is engraved or embossed on an asset in a warehouse with challenging lighting conditions or other similar environment.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

An embodiment of the present invention is directed to a combination of two deep-learning computer vision models—customized with post-processing—wrapped in a mobile application (e.g., an Android application, etc.) that is backed by an Application Programming Interface (API) supporting concurrent mobile users to accomplish asset serialization tasks in a warehouse or other storage environment.

An embodiment of the present invention is directed to an asset identification system for unique assets in the defense, healthcare and other environments. Such assets are generally customized without traditional serial numbers or identifiers. Management of such unique assets may be associated with a legacy system or other back-end system, such as an enterprise resource planning (ERP) system.

An embodiment of the present invention is directed to identifying and recognizing serial numbers that are engraved, embossed, stenciled or otherwise imprinted on a unique asset. For example, an entity may manage various assets in a warehouse environment. An embodiment of the present invention is further directed to such assets in a warehouse setting with low lighting and other challenging conditions that make it difficult to ascertain such identifiers.

Assets may be considered sensitive in nature, especially in the defense and healthcare industries. Accordingly, there is a heightened need or urgency to accurately capture such assets and further identify location and other tracking information. In such instances, unique assets are not easily replaceable and therefore need to be accurately accounted.

Within the defense industry, exemplary assets may include weapons or weaponry of various sizes as well as other military machinery and components made specifically for defense and government use. Within the healthcare industry, exemplary assets may include non-traditional supplies that are made specifically for government, public health and/or other specialized use (as opposed to common retail products). Accordingly, such unique or customized assets do not have a traditional serial number or other identifier that can be easily scanned. In addition, there is no requirement to tag or add a RFID or other identifier. An embodiment of the present invention is directed to tracking assets without a traditional serial number or other tracking system or methodology in place.

Various factors contribute to the difficulty in accurately capturing identification information in unique assets. There is generally no uniformity in the type of imprinting or engraving. Different manufacturers may each apply different methods and types of imprinting, engraving, etc. The actual identifier may be of varying typeset, font size, color, placement, etc. In addition, such assets are generally stored and managed in challenging environments such as warehouses and storage units. For example, such environments are not well lighted and oftentimes there is little organization or order. Also, some assets are difficult to handle (e.g., rotate or move) due to size, sensitivity and/or limited access. Depending on the type of asset, other restrictions may be relevant.

An embodiment of the present invention is directed to creating a model, training the model and then deploying the model on a handheld mobile device. Accordingly, image and data processing may be performed on the edge by the mobile device where the mobile device computes and performs text detection and text recognition. For example, a user interface executing on a mobile device may be used to capture an image and identify a serial number or identifier.

According to an embodiment of the present invention, a user interface may provide a confirmation message and one or more possible results with a corresponding confidence level. Confidence level may represent a probability that the captured serial number is accurately captured or matches one on a predetermined list, such as a shipping document, inventory, etc. If the confidence is questionable, a human may be involved to verify or validate. Once verified or validated, the model may learn and further process asset data based on the human feedback.

The model training may involve identifying datasets representing examples of text and identifiers. An embodiment of the present invention may then fine-tune the datasets. This may involve taking images of actual assets with embossed, stenciled identifiers in warehouse conditions (e.g., bad lighting, etc.). The datasets may be refined by performing random augmentations during the model training process. This allows the datasets to have an infinite number of images to train the model. Augmentation may involve variations in the images such as varying degrees of rotations, addition of blur, image skew and/or contrast, applying pixilation, varying image sharpness, adding random geometric distortions, modifying or obscuring digits, etc. The augmentation performed may be catered to a particular use case, application and/or environment.

An embodiment of the present invention integrates two separate models that are stitched together with custom code. An output of a first model that performs text detection serves as input to a second model that performs recognition. In addition, an output of the second model may be based on user feedback (e.g., settings) and further subjected to post processing.

The second model that performs recognition may provide several different guesses/predictions ranked by confidence level. In this example, the end user may view multiple results. A number of configuration parameters may be applied to the prediction algorithm to vary the type of predictions that are generated and results that are displayed.

According to an embodiment of the present invention, post processing may involve detecting and recognizing serial numbers or other identifier candidates. In addition, heuristics may be applied to improve recognition and accuracy.

Figure 1:
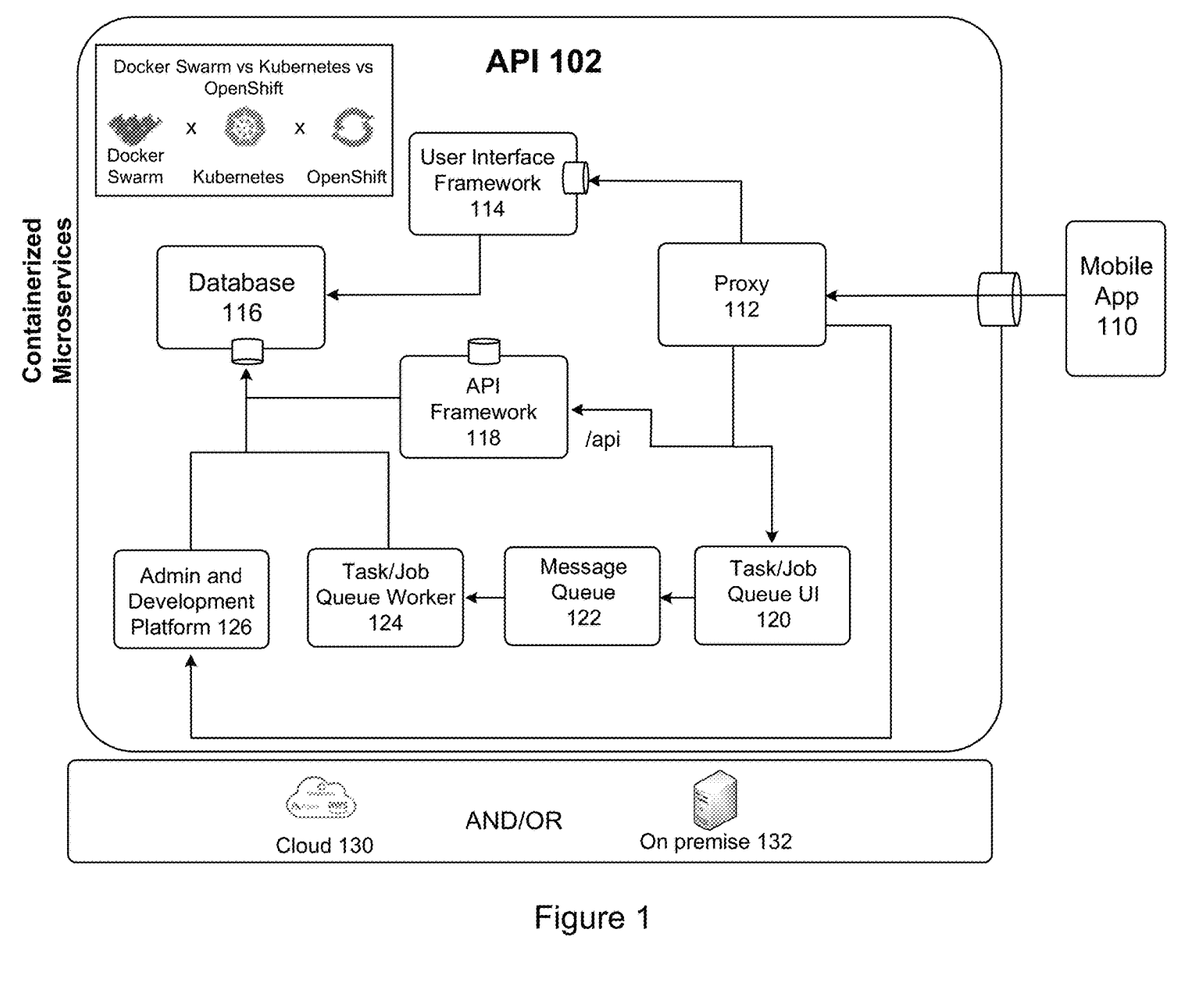
FIG. 1 is an exemplary flow diagram, according to an embodiment of the present invention.

FIG. 1 is an exemplary architecture diagram, according to an embodiment of the present invention. An exemplary embodiment may include a mobile application 110 (e.g., an Android Application, written in Kotlin) that utilizes two deep-learning models to perform detection and recognition of unscannable serial numbers on assets.

According to an embodiment of the present invention, API 102 may represent a Docker-based suite of microservices, written in Python and TypeScript, that provides a Representational State Transfer Application Programming Interface (REST API) to a PostgreSQL database 116 that stores application data. Together, these services enable concurrent users of mobile application 110 as well as basic administrative features, such as user management. Being containerized, it may be deployable on-prem 132 or in-cloud 130, anywhere Docker is available as a container runtime.

Mobile Application 110 may communicate with Proxy 112 through which requests may be transmitted to User Interface Framework 114, API Framework 118, Task/Job Queue UI 120 as well as Admin and Development Platform 126. Other services may include Message Queue 122, Task/Job Queue Worker 124 and Database 116. Together, these services provide a backend data store to persist user actions on Mobile App 110, allowing concurrent users of the application to work on the same asset serialization tasks. These services also provide added administrative functionality for application admins.

Figure 2:
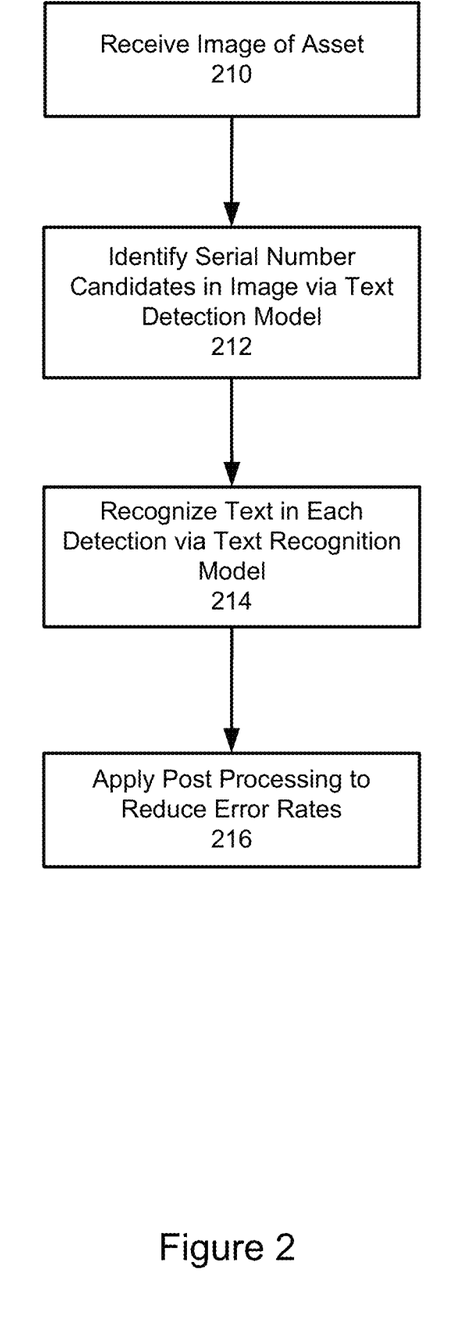
FIG. 2 is an exemplary flowchart, according to an embodiment of the present invention.

FIG. 2 is an exemplary flowchart, according to an embodiment of the present invention. At step 210, an image may be received. At step 212, a text-detection model may identify serial number candidates in the image of a given asset. At step 214, a text-recognition model recognizes the text in each detection. At step 216, a post-processing step is applied to reduce error rates by applying several heuristics against the first two steps' predictions. Other variations in implementation and design may be realized. While the process of FIG. 2 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 210, an image may be received. The image may be scanned by a mobile device. In another example, a drone may capture images. A scanning structure may be used to capture images of assets as they are transported to a destination, such as a warehouse location. Other forms of image capture may be applied.

An embodiment of the present invention may be implemented in various configurations. In addition, configurations may be modified to support various assets, ranging from very small assets (e.g., microchips, etc.) to large assets (e.g., vehicles, machinery, etc.) of varying sizes, shapes, dimensions and types.

At step 212, a text-detection model may identify serial number candidates in the image of a given asset. According to an embodiment of the present invention, a text-detection model may represent a Python implementation of the open-source, MIT licensed Character Region Awareness for Text Detection (CRAFT) model.

At step 214, a text-recognition model recognizes the text in each detection. A text-recognition model may represent a Python implementation of an open-source, Apache 2.0 licensed scene text recognition model.

At step 216, a post-processing step is applied to reduce error rates by applying several heuristics against the first two steps' predictions. These heuristics may be enabled by a workflow provided by the user interface of a mobile application. Post-processing, as well as conversion of the text-detection model's output to input for the text-recognition model, may be applied independently of the open-source implementations of the model architectures. In addition, this post-processing may be customizable at runtime, allowing users of the model the fine-grain control needed to ensure accuracy on a variety of asset serialization tasks.

According to an exemplary illustration, deep-learning models may be compatible for using the models' frameworks' respective tools, PyTorch and TensorFlow Lite, which are licensed under a BSD 2.0 and Apache 2.0 licenses, respectively. Other implementations may be realized.

Figure 3:
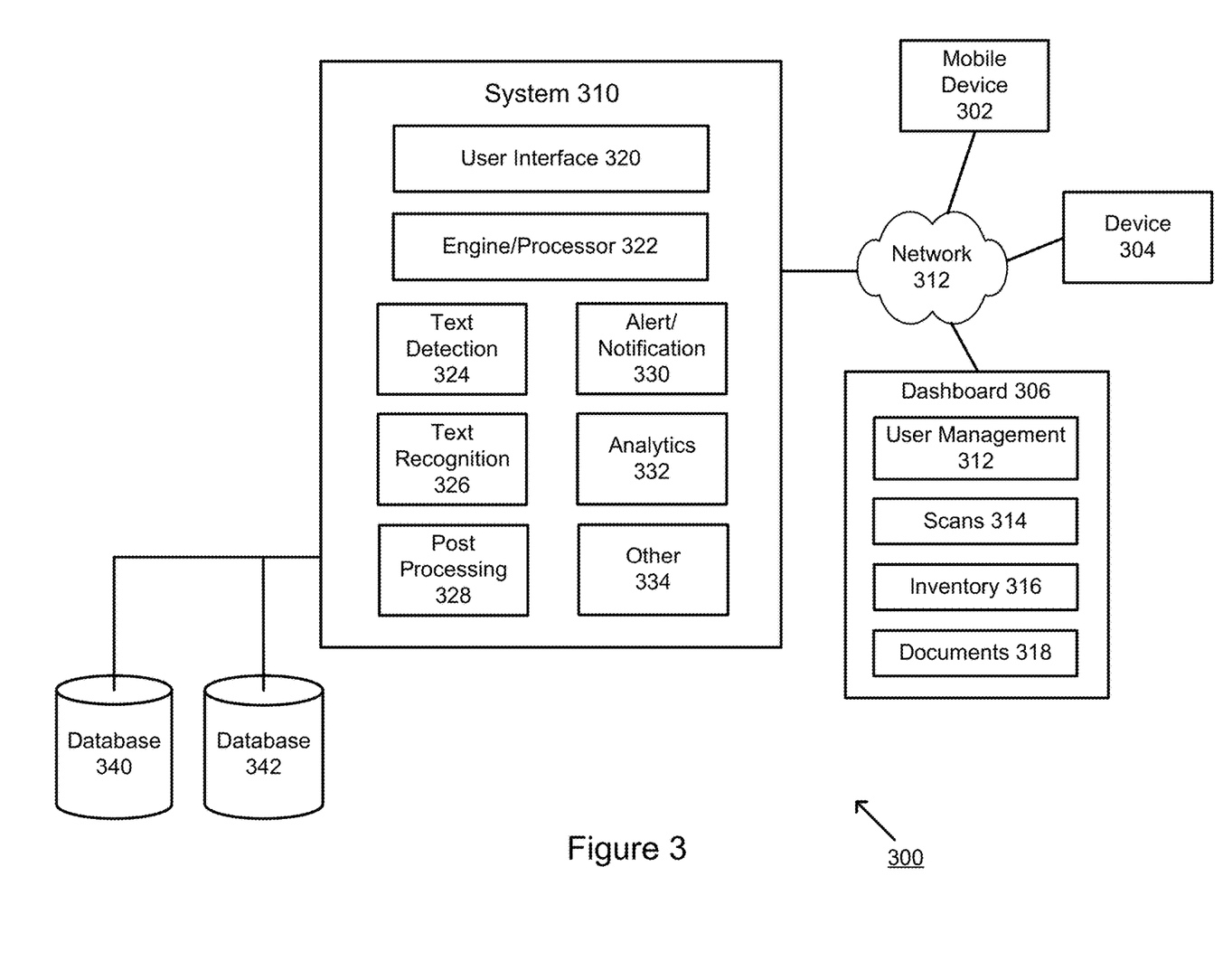
FIG. 3 is an exemplary system diagram, according to an embodiment of the present invention.

FIG. 3 is an exemplary system diagram, according to an embodiment of the present invention. System 310 executes and supports text detection and recognition through various configurations and architectures. Mobile Device 302 may communicate with System 310 via Network 312. In addition, Mobile Device 302 may be integrated with System 310 where processing occurs on the mobile device itself. System 310 may communicate and integrate with various other devices represented by 304 as well as dashboard interfaces represented by 306.

Dashboard 306 may provide functions relating to User Management 312, Scans 314, Inventory 316 and Documents 318. Dashboard 306 may include an interactive interface that provides functions and/or details relating to Scans (e.g., view scans, export scans), Inventory (e.g., view inventory, audit inventory, item view) and Documents (e.g., view documents, create documents, modify documents, etc.).

User Management 312 enables a user to manage user privileges, access, roles, etc. For example, an exemplary interface may include contact information (e.g., email, phone number, etc.); name (or other identifier); status (e.g., active); role/position (e.g., supervisor) and permissible actions. User Management 312 may also enable the creation, deletion and/or modification of users.

Scans 314 may relate to asset scans captured through various devices including mobile device, drones, scanning structures, etc. In addition, scans may be electronically imported from a source. For example, an image file from a warehouse may be used for text detection and recognition. Other scenarios may be supported. For example, users may view past scans and deep-learning model predictions to validate correct predictions and correct incorrect ones.

Inventory 316 may provide details relating to serial number, National Stock Number (NSN) (or other identifier), add status, quantity, place, location, sublocation, etc. Individual item details may be available through an item view. For example, details relating to an item may include Place, Location, Sublocation, Quantity, whether the item is an add or not.

Documents 318 may relate to shipping documents, inventory documents and/or other references. These documents may show their related items and completion status of the scan activity for each item.

System 310 may include User Interface 320 that supports various interactions on devices including mobile devices, other devices, computers, laptops, tablets, etc. User Interface 320 may enable users and/or other entities to interact with Engine/Processor 322. User Interface 320 may support various applications including browsers, mobile interfaces, dashboards, interactive interfaces, etc.

Engine/Processor 322 may support various functions and processes via modules including Text Detection 324, Text Recognition 326, Post Processing 328, Alert/Notification 330, Analytics 332, etc. Other functions and features represented by 334 may be supported in various forms and implementations.

Text Detection 324 may execute a text recognition model. Text Detection 324 may identify serial number candidates in the image of a particular asset or group of assets.

Text Recognition 326 may execute a text recognition model. Text recognition 326 may perform recognition and provide multiple results based on confidence level. In addition, various configuration parameters may be applied to the prediction algorithm to vary the type of predictions that are generated and results that are displayed.

Post Processing 328 may apply heuristics to improve recognition and accuracy.

Alert/Notification 330 may provide a communication relating to an event. This may include an unexpected event, such as missing assets, new or unexpected asset, etc.

Analytics 332 may track and analyze asset data. In addition, user activity may be tracked and managed. This may include user login, scanning data, images, model predictions, user feedback, location data, etc. Analytics 332 may also be used to validate and generate new datasets to train and refine models.

System 310 may store and manage data in various formats, including Databases 340, 342. Data may relate to assets, location information, shipping documents, warehouse data, etc. System 310 may be communicatively coupled to Databases 340, 342. Databases 340, 342 may include any suitable data structure to maintain the information and allow access and retrieval of the information. Databases 340, 342 may be any suitable storage device or devices. The storage may be local, remote, or a combination thereof with respect to Databases 340, 342. Databases 340, 342 may have back-up capability built-in. Communications with Databases 340, 342 may be over a network, or communications may involve a direct connection between Databases 340, 342 and System 310, as depicted in FIG. 3. Databases 340, 342 may also represent cloud or other network based storage.

Networks may be a wireless network, a wired network or any combination of wireless network and wired network. Although Network 312 is depicted as one network for simplicity, it should be appreciated that according to one or more embodiments, Network 312 may comprise a plurality of interconnected networks, such as, for example, a service provider network, the Internet, a cellular network, corporate networks, or even home networks, or any of the types of networks mentioned above. Data may be transmitted and received via Network 312 utilizing a standard networking protocol or a standard telecommunications protocol.

While FIG. 3 illustrates individual devices or components, it should be appreciated that there may be several of such devices to carry out the various exemplary embodiments. Users may communicate with various entities using any mobile or computing device, such as a laptop computer, a personal digital assistant, a smartphone, a smartwatch, smart glasses, other wearables or other computing devices capable of sending or receiving network signals.

The system 300 of FIG. 3 may be implemented in a variety of ways. Architecture within system 300 may be implemented as hardware components (e.g., module) within one or more network elements. It should also be appreciated that architecture within system 300 may be implemented in computer executable software (e.g., on a tangible, non-transitory computer-readable medium) located within one or more network elements. Module functionality of architecture within system 300 may be located on a single device or distributed across a plurality of devices including one or more centralized servers and one or more mobile units or end user devices. The architecture depicted in system 300 is meant to be exemplary and non-limiting. For example, while connections and relationships between the elements of system 300 are depicted, it should be appreciated that other connections and relationships are possible. The system 300 described below may be used to implement the various methods herein, by way of example. Various elements of the system 300 may be referenced in explaining the exemplary methods described herein.

An embodiment of the present invention may support a wide range of use cases and applications. For example, an employee in a warehouse may receive a shipment of assets with a shipping document that provides an inventory of the assets that were shipped. Current processes require a team of workers to open the shipment and then read and confirm asset serial numbers one by one where each serial number may include 20 or so random alphanumeric digits. In this exemplary scenario, the shipping document may contain a bar code that can be scanned. The bar code digitally embeds details relating to the assets, serial numbers, sender, instructions, etc. The shipping document may be used to cross-check and ensure that all the assets are properly received in the proper state or condition. With the mobile device or other instrument, a user may scan the assets. With each scan or set of scans, the system may present an identifier (or likely set of identifiers) which the user may accept or reject. The identifier may represent a prediction that can be further cross-referenced with the shipping document. If accepted, the mobile device may check off the corresponding item from the shipping document. The process may continue until all items listed on the shipping document are verified.

Information from the shipping document may be used to assist in the verification process. For example, a shipping document may identify asset characteristics which may be used to support low confidence assessments. If the shipping document indicates that the identifier is associated with a weapon, this additional information may be presented with the prediction to the user. In this example, if the user is scanning a weapon, the additional asset characteristics will improve the confidence level of the assessment.

A similar process or workflow may be applied to assets that are loaded for shipment or transit.

An embodiment of the present invention may be applied to an audit process to perform an inventory of assets maintained at a certain location. An embodiment of the present invention may integrate with a database that manages and stores asset location data. Granularity of asset location data may be as coarse or as fine as desired. The asset location data may be used for audit, validation, inventory and tracking purposes. For example, an embodiment of the present invention may track asset placement including a location on a particular shelf in a warehouse or other storage facility. In addition, other use cases may involve locating a specific asset, confirming a number of assets, confirming a location of assets for an upcoming delivery or other need, etc.

An embodiment of the present invention may be directed to asset authentication, security and/or other purposes. For example, an embodiment of the present invention may identify assets that are missing (e.g., identified in a shipping document but not scanned upon arrival), assets that were unexpected (e.g., an additional asset has been identified that was not listed in the shipping document) as well as compromised assets or other anomalies.

An embodiment of the present invention may provide an alert or other notification when an unexpected event has occurred, e.g., an unexpected asset has been identified, an asset is missing as well as other unexpected events. For example, an asset that is not on the shipping document may be identified as an "add." Based on this detection, an embodiment of the present invention may invoke a process to address the "add." This may involve tracking which entity sent the package, informing the entity and further investigating as to whether the shipping document was incorrect. According to another example, a missing item may be identified. In response, an embodiment of the present invention may generate an alert that an item on the shipping document has not been accounted for. Based on information in the shipping document, an embodiment of the present invention may notify the sender and generate a communication regarding the same.

Other information may be tracked and additional analysis may be performed. This information may be captured on the backend from the mobile device through an API and further communicated to a remote database system. Various types of user activity may be tracked and managed. This may include user login, scanning data, images, model predictions, user feedback, location data, etc. This information may also be used to validate and generate new datasets to train and refine models.

An embodiment of the present invention may support various user interfaces depending on the type of user, such as administrators, managers, supervisors, individual contributors, etc. For example, different user views may be applied through the mobile application. For example, an administrator role may provide a wide range of scanning data. A floor manager may view how team members and workers are performing. An embodiment of the present invention may be implemented through a web application executed on a browser. Other applications involving business intelligence, performance, and analytics may be captured. For example, inventory dashboards may be generated and provided which include data relating to various types of assets. A user may perform a search by using a set of factors, including serial numbers, asset types, locations, activity (e.g., all assets scanned on a particular day/time).

An embodiment of the present invention may support a learning component as well as a human in the loop for validation. This feature enables users to provide feedback in the form of validation to improve model accuracy and performance.

An embodiment of the present invention may be extended to verify authenticity of assets and identify counterfeit or suspicious assets. For example, irregular objects may be identified on a device or board. This may include an extra resistor, a misplaced component, improper logo or placement, an irregular shape, out of commission part, etc.

Figure 4:
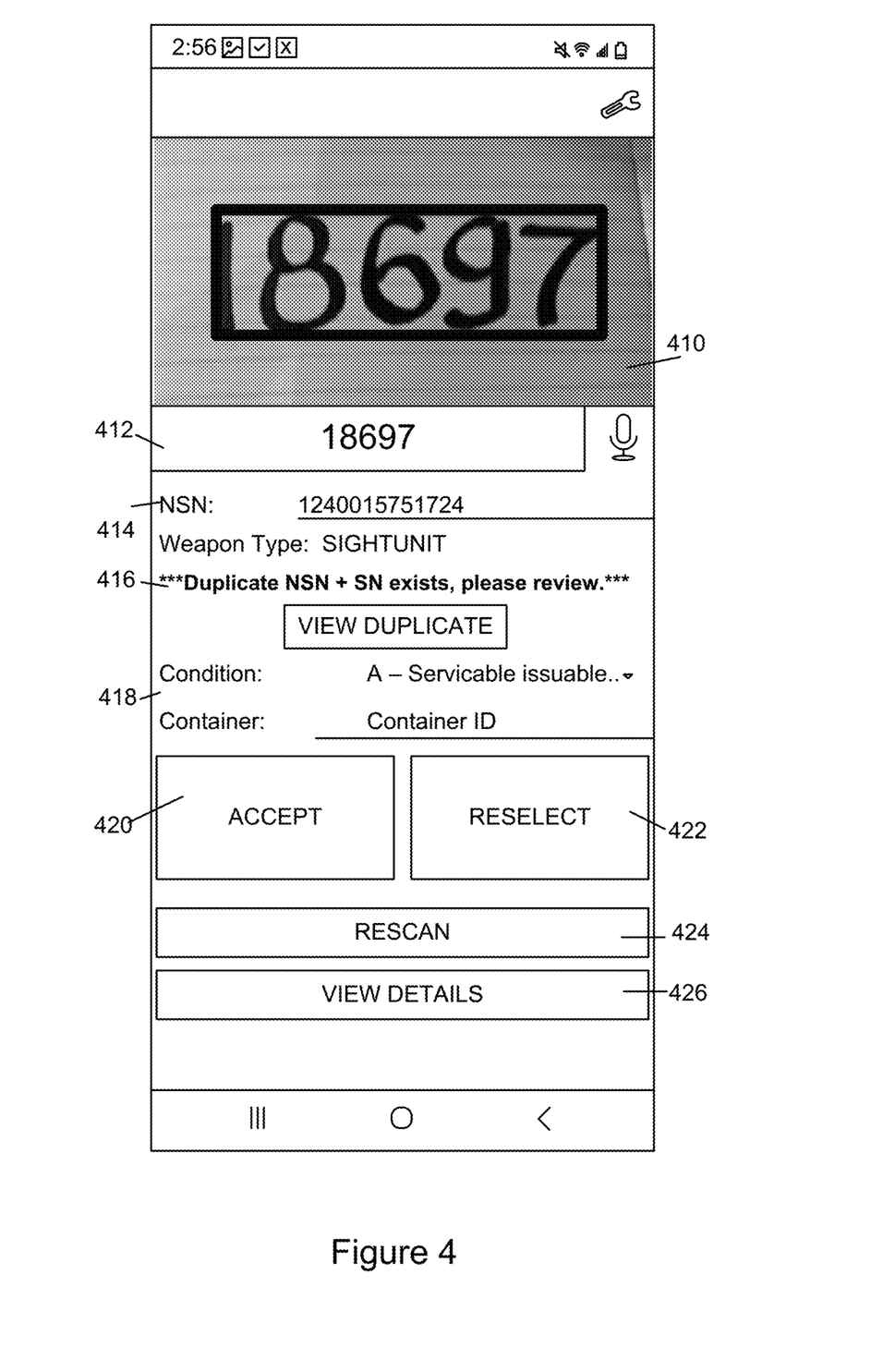
FIG. 4 is an exemplary user interface, according to an embodiment of the present invention.

FIG. 4 illustrates exemplary user interfaces displayed on a mobile device, according to an embodiment of the present invention. As shown in FIG. 4, a scan of an image has been captured at 410. User actions, such as correcting the scan with voice input, may also be captured by various icons. An embodiment of the present invention may display corresponding captured text (at 412) and other information associated with the captured text. This may include identifiers and other characteristics, at 414, 418. In addition, feedback indicating potential user error, such as duplicate scanning, may be shown at 416. A user may have a set of options, including Accept 420, Reselect 422, Rescan 424, View List 426, etc.

FIGS. 5-9 represent exemplary interfaces executing on a mobile device, according to an embodiment of the present invention.

Figure 5:
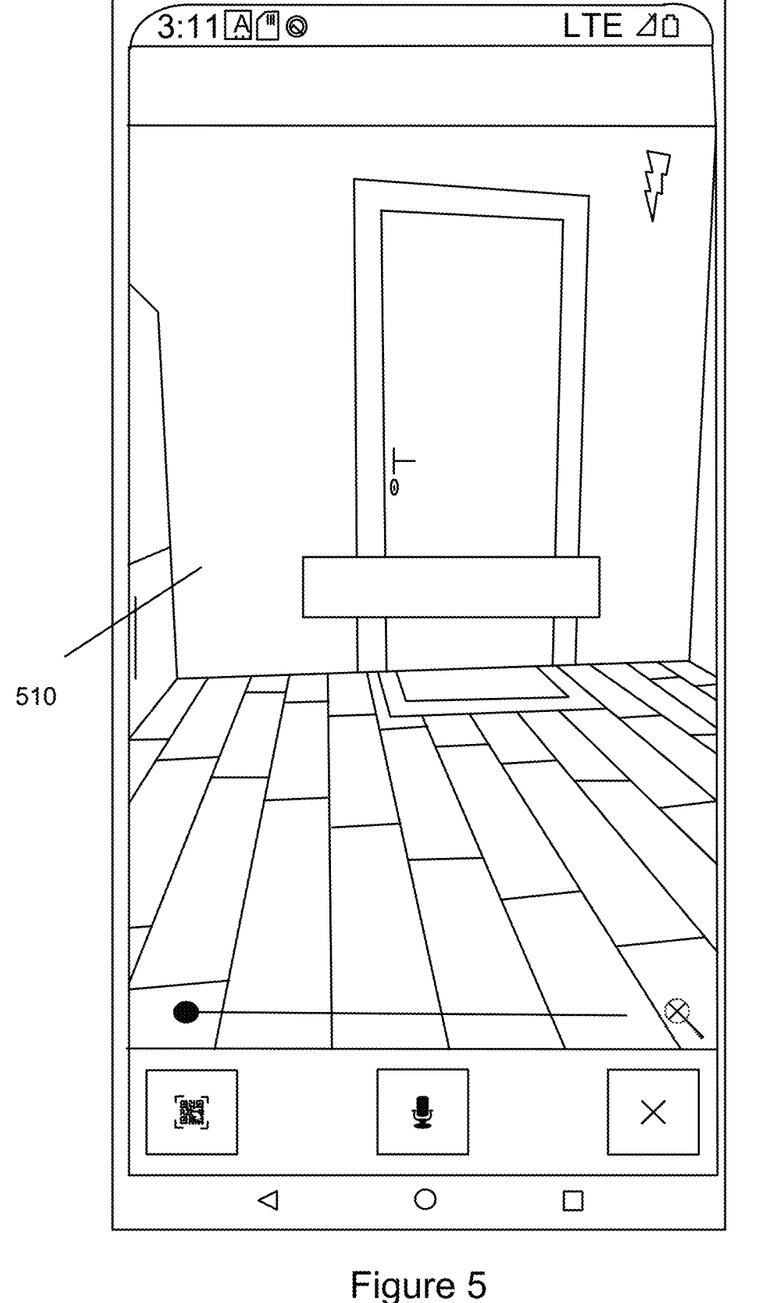
FIG. 5 is an exemplary user interface, according to an embodiment of the present invention.

FIG. 5 is an exemplary user interface, according to an embodiment of the present invention. FIG. 5 is a representative camera view for capturing asset identification markings. As shown in FIG. 5, the room in the image 510 may represent a default camera view when the application is running on an emulator, for example.

Figure 6:
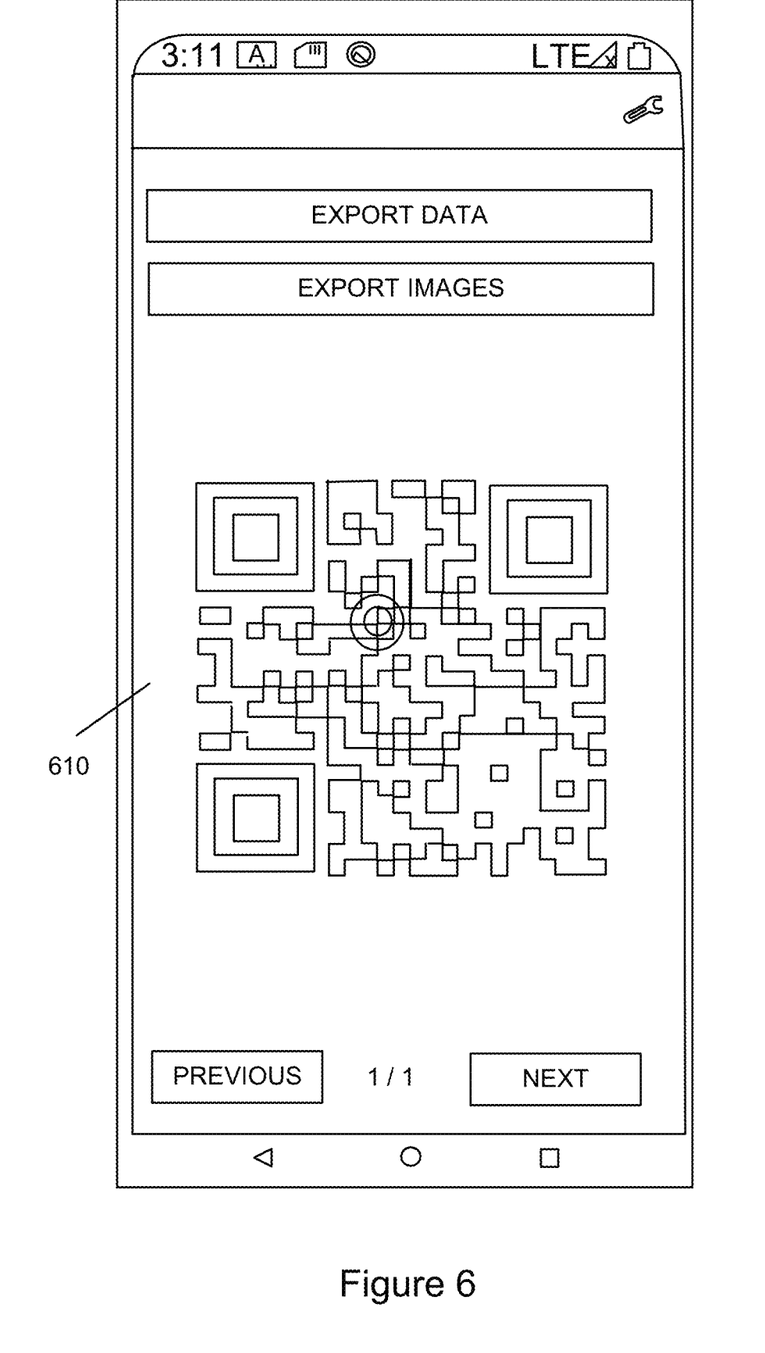
FIG. 6 is an exemplary user interface, according to an embodiment of the present invention.

FIG. 6 is an exemplary user interface, according to an embodiment of the present invention. FIG. 6 illustrates how data can be imported and/or exported. In this example, FIG. 6 illustrates a scanned QR code 610. Other codes and/or images may be captured for import. For example, the QR code 610 may represent a shipping document or other source of asset information that may be used to cross-check and/or otherwise verify asset data. FIG. 6 also illustrates how data may be exported as data and/or images.

Figure 7:
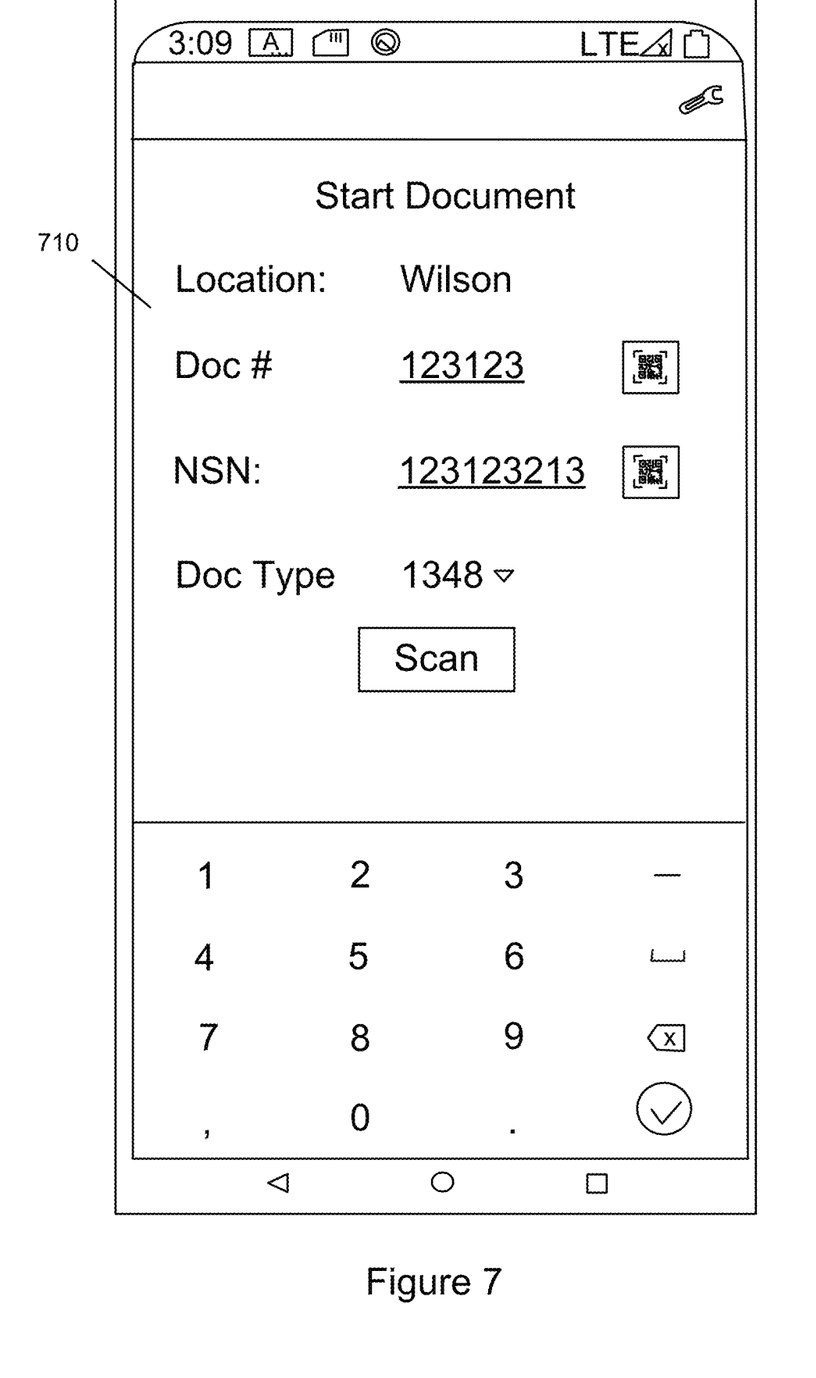
FIG. 7 is an exemplary user interface, according to an embodiment of the present invention.

FIG. 7 is an exemplary user interface, according to an embodiment of the present invention. FIG. 7 illustrates how shipping documents may be created. As shown by 710, a location may be identified. Other data may include document number, NSN, document type, etc. A user may manually enter the identifiers and/or scan an image.

Figure 8:
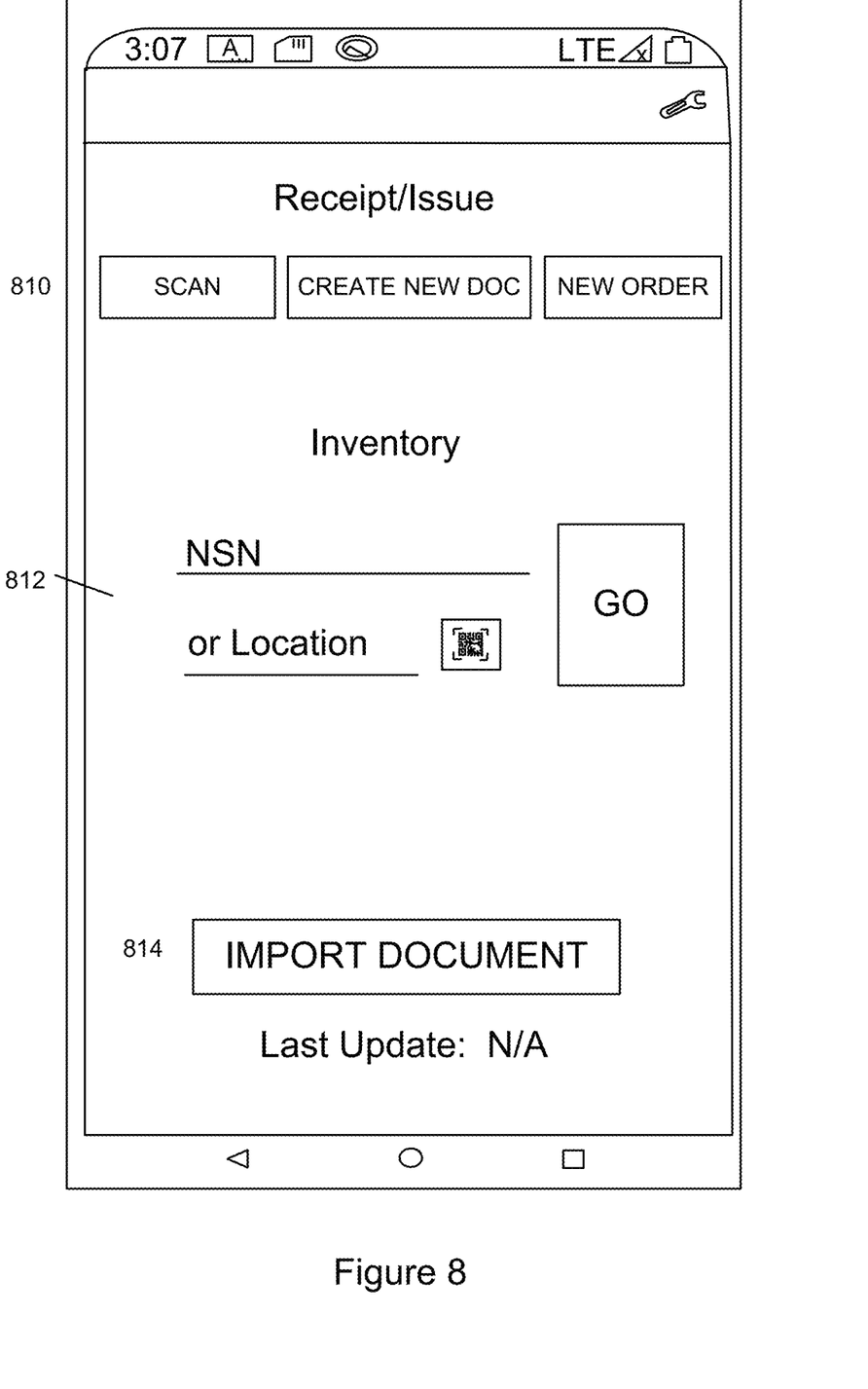
FIG. 8 is an exemplary user interface, according to an embodiment of the present invention.

FIG. 8 is an exemplary user interface, according to an embodiment of the present invention. FIG. 8 illustrates how shipping documents may be imported. At 810, a user may scan a document, create a new document and initiate a new order. As shown at 812, a QR code may be scanned. Other user inputs may be supported. Document import may be initiated at 814.

Figure 9:
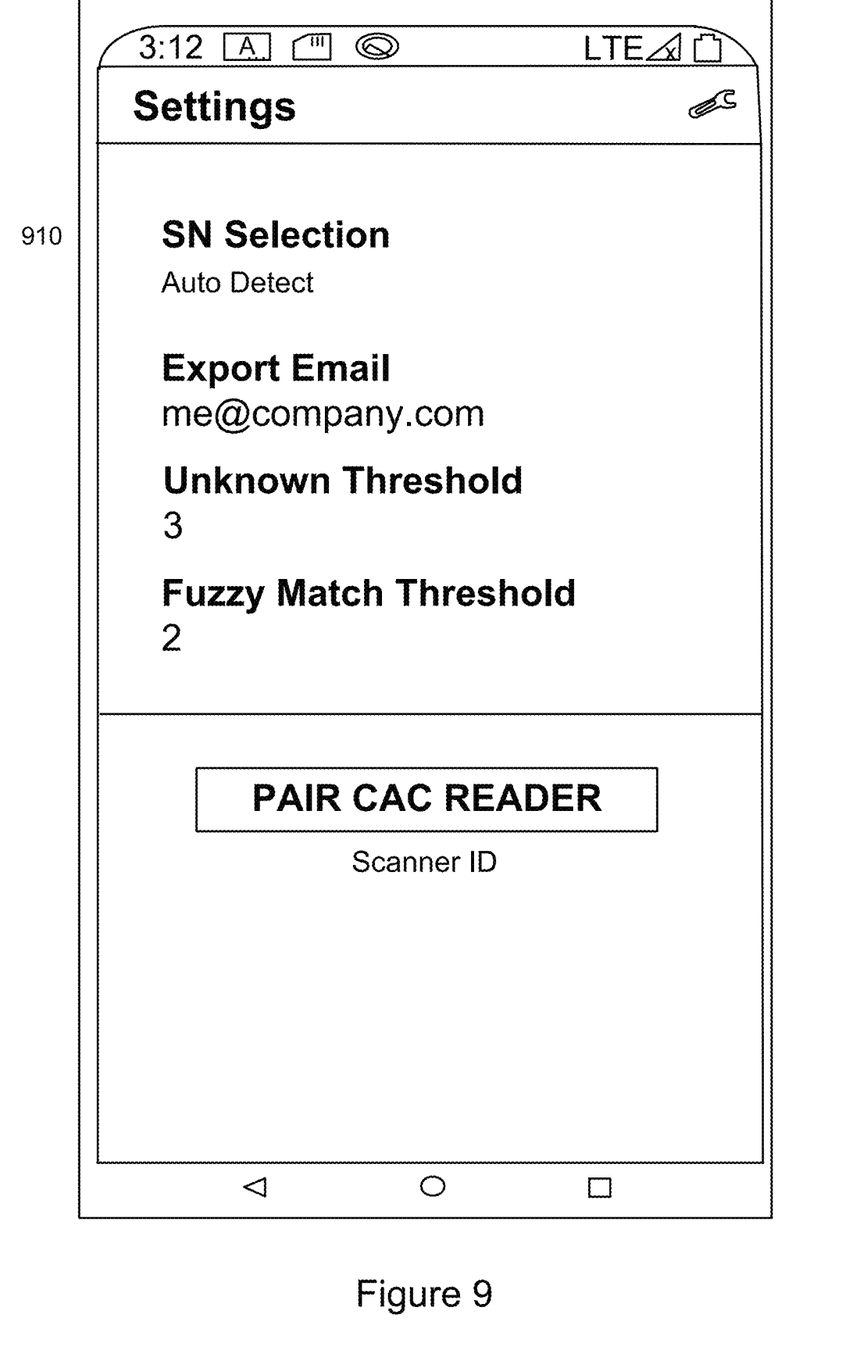
FIG. 9 is an exemplary user interface, according to an embodiment of the present invention.

FIG. 9 is an exemplary user interface, according to an embodiment of the present invention. FIG. 9 illustrates deep-learning model customizations that a user may configure at 910. FIG. 9 also illustrates how a user may pair a government-issued CAC card with the application to login. Other cards, equipment, and/or devices may be identified and paired.

The user interfaces are exemplary only; other variations and modifications may be realized for various use cases and applications.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements.

The foregoing descriptions provide examples of different configurations and features of embodiments of the invention. While certain nomenclature and types of applications/hardware are described, other names and application/hardware usage is possible, and the nomenclature is provided by way of non-limiting examples only. Further, while particular embodiments are described, it should be appreciated that the features and functions of each embodiment may be combined in any combination as is within the capability of one skilled in the art. The figures provide additional exemplary details regarding the various embodiments.

Various exemplary methods are provided by way of example herein. The methods described can be executed or otherwise performed by one or a combination of various systems and modules.

The use of the term computer system in the present disclosure can relate to a single computer or multiple computers. In various embodiments, the multiple computers can be networked. The networking can be any type of network, including, but not limited to, wired and wireless networks, a local-area network, a wide-area network, and the Internet.

According to exemplary embodiments, the System software may be implemented as one or more computer program products, for example, one or more modules of computer program instructions encoded on a computer-readable medium for execution by, or to control the operation of, data processing apparatus. The implementations can include single or distributed processing of algorithms. The computer-readable medium can be a machine-readable storage device, a machine-readable storage substrate, a memory device, or a combination of one or more them. The term "processor" encompasses all apparatus, devices, and machines for processing data, including by way of example a programmable processor, a computer, or multiple processors or computers. The apparatus can include, in addition to hardware, software code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

A computer may encompass all apparatus, devices, and machines for processing data, including by way of example a programmable processor, a computer, or multiple processors or computers. It can include, in addition to hardware, code that creates an execution environment for the computer program in question, e.g., code that constitutes processor firmware, a protocol stack, a database management system, an operating system, or a combination of one or more of them.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computer-readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While the embodiments have been particularly shown and described within the framework for conducting analysis, it will be appreciated that variations and modifications may be affected by a person skilled in the art without departing from the scope of the various embodiments. Furthermore, one skilled in the art will recognize that such processes and systems do not need to be restricted to the specific embodiments described herein. Other embodiments, combinations of the present embodiments, and uses and advantages of the will be apparent to those skilled in the art from consideration of the specification and practice of the embodiments disclosed herein. The specification and examples should be considered exemplary.

What is claimed is:

1. A computer-implemented system for unique asset serialization, the system comprising:
    an interactive user interface that is configured to receive one or more inputs;
    a database interface that communicates with a database that stores and manages asset data; and
    a processor executing on a mobile device and coupled to the interface and the database interface, the processor further configured to perform the steps of:
        receiving, via an input interface, one or more images of a unique asset;
        detecting, via a computer vision detection model, one or more unique serial number candidates on the unique asset in the received one or more images of the unique asset;
        performing, via a prediction model, text recognition on the one or more unique serial number candidates and identifying one or more predicted unique serial numbers with corresponding confidence levels;
        performing post processing on the one or more predicted unique serial numbers to improve prediction accuracy;
        displaying, via the interactive user interface executing on the mobile device, the one or more predicted unique serial numbers;
        receiving one or more user inputs responsive to the one or more predicted unique serial numbers; and
        improving the prediction model based on the one or more user inputs.

2. The system of claim 1, wherein the user interface comprises a dashboard that supports user management features, scans, inventory and documents.

3. The system of claim 1, wherein the user interface provides asset level data comprising one or more of: asset identifier, asset type, asset location, asset quantity.

4. The system of claim 1, wherein the asset comprises one or more of: a unique non-traditional healthcare asset and government issued weaponry.

5. The system of claim 1, wherein the scan of the image is taken from one or more of: the mobile device, a drone device and a scanning structure.

6. The system of claim 1, wherein the post processing comprises applying heuristics to improve text recognition.

7. The system of claim 1, wherein the prediction model is configured by a set of configuration parameters customized by a user.

8. The system of claim 1, wherein the prediction model performs a cross reference with a shipping document related to the asset.

9. The system of claim 1, wherein an alert is generated when an event occurs, the event comprising one or more of: an unexpected asset is identified and an asset is missing.

10. The system of claim 1, wherein a remote processor performs asset data analysis to generate new datasets and train the prediction model.

11. A computer-implemented method for unique asset serialization, the method comprising the steps of:
    receiving, via an input interface, one or more images of a unique asset;
    detecting, via a computer vision detection model, one or more unique serial number candidates on the unique asset in the received one or more images of the unique asset;
    performing, via a prediction model, text recognition on the one or more unique serial number candidates and identifying one or more predicted unique serial numbers with corresponding confidence levels;
    performing post processing on the one or more predicted unique serial numbers to improve prediction accuracy;
    displaying, via an interactive user interface executing on the mobile device, the one or more predicted unique serial numbers;

receiving one or more user inputs responsive to the one or more predicted unique serial numbers; and improving the prediction model based on the one or more user inputs.

12. The method of claim 11, wherein the user interface comprises a dashboard that supports user management features, scans, inventory and documents.

13. The method of claim 11, wherein the user interface provides asset level data comprising one or more of: asset identifier, asset type, asset location, asset quantity.

14. The method of claim 11, wherein the asset comprises one or more of: a unique non-traditional healthcare asset and government issued weaponry.

15. The method of claim 11, wherein the scan of the image is taken from one or more of: the mobile device, a drone device and a scanning structure.

16. The method of claim 11, wherein the post processing comprises applying heuristics to improve text recognition.

17. The method of claim 11, wherein the prediction model is configured by a set of configuration parameters customized by a user.

18. The method of claim 11, wherein the prediction model performs a cross reference with a shipping document related to the asset.

19. The method of claim 11, wherein an alert is generated when an event occurs, the event comprising one or more of: an unexpected asset is identified and an asset is missing.

20. The method of claim 11, wherein a remote processor performs asset data analysis to generate new datasets and train the prediction model.

* * * * *